(12) United States Patent
Gozu (10) Patent No.: US 12,042,968 B2
(45) Date of Patent: Jul. 23, 2024

(54) PLASTICIZING DEVICE, THREE-DIMENSIONAL SHAPING DEVICE, AND INJECTION MOLDING DEVICE

(71) Applicant: SEIKO EPSON CORPORATION, Tokyo (JP)

(72) Inventor: Masayuki Gozu, Ina (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/815,853

(22) Filed: Jul. 28, 2022

(65) Prior Publication Data

US 2023/0030646 A1 Feb. 2, 2023

(30) Foreign Application Priority Data

Jul. 28, 2021 (JP) .................................. 2021-123070

(51) Int. Cl.
| | |
|---|---|
| *B29C 45/47* | (2006.01) |
| *B29C 45/58* | (2006.01) |
| *B29C 45/74* | (2006.01) |
| *B29C 64/209* | (2017.01) |
| *B33Y 30/00* | (2015.01) |

(52) U.S. Cl.
CPC .............. *B29C 45/47* (2013.01); *B29C 45/58* (2013.01); *B29C 45/74* (2013.01); *B29C 64/209* (2017.08); *B33Y 30/00* (2014.12)

(58) Field of Classification Search
CPC ......... B29C 45/47; B29C 45/58; B29C 45/74; B29C 45/464; B29C 64/209; B29C 64/118; B33Y 30/00
See application file for complete search history.

(56) References Cited

U.S. PATENT DOCUMENTS

2007/0184146 A1* 8/2007 Takeuchi ................ B29C 45/53
425/589
2018/0236705 A1* 8/2018 Conrad .................... B29C 45/57

FOREIGN PATENT DOCUMENTS

JP        2010-241016        10/2010

\* cited by examiner

*Primary Examiner* — Nahida Sultana
*Assistant Examiner* — Mohamed K Ahmed Ali
(74) *Attorney, Agent, or Firm* — WORKMAN NYDEGGER (57) ABSTRACT

A plasticizing device includes: a drive motor; a screw shaft rotated by the drive motor; a flat screw having a coupling surface coupled to the screw shaft and a groove forming surface in which a groove is formed, and configured to rotate around the screw shaft; a barrel having a facing surface facing the groove forming surface, and formed with a communication hole; a heating unit configured to heat a material supplied to between the flat screw and the barrel; and a bearing part configured to rotatably support the screw shaft and receive a thrust load applied to the screw shaft from the flat screw. The groove forming surface and the facing surface are separated from each other at a predetermined interval.

13 Claims, 9 Drawing Sheets

PLASTICIZING DEVICE, THREE-DIMENSIONAL SHAPING DEVICE, AND INJECTION MOLDING DEVICE

The present application is based on, and claims priority from JP Application Serial Number 2021-123070, filed Jul. 28, 2021, the disclosure of which is hereby incorporated by reference herein in its entirety.

BACKGROUND

1. Technical Field

The present disclosure relates to a plasticizing device, a three-dimensional shaping device, and an injection molding device.

2. Related Art

JP-A-2010-241016 discloses a plasticizing device including a rotor in which a spiral groove is formed, and including a barrel that faces an end surface of the rotor and has a communication hole at a center.

The rotor as described above is also referred to as a flat screw. In the plasticizing device including the flat screw and the barrel, it is preferable to provide an appropriate clearance between the flat screw and the barrel in order to improve plasticizing capacity. However, when a shaft of the flat screw is displaced by a thrust load generated due to an increase in an internal pressure between the flat screw and the barrel, an appropriate clearance cannot be secured, and the plasticizing capacity may be reduced.

SUMMARY

According to a first embodiment of the present disclosure, a plasticizing device is provided. The plasticizing device includes: a drive motor; a screw shaft rotated by the drive motor; a flat screw having a coupling surface coupled to the screw shaft and a groove forming surface in which a groove is formed, and configured to rotate around the screw shaft; a barrel having a facing surface facing the groove forming surface, and formed with a communication hole; a heating unit configured to heat a material supplied to between the flat screw and the barrel; and a bearing part configured to rotatably support the screw shaft and receive a thrust load applied to the screw shaft from the flat screw. The groove forming surface and the facing surface are separated from each other at a predetermined interval.

According to a second embodiment of the present disclosure, a three-dimensional shaping device is provided. The three-dimensional shaping device includes: the plasticizing device; a stage having a shaping surface; and a nozzle configured to discharge a plasticized material supplied from the plasticizing device toward the shaping surface.

According to a third embodiment of the present disclosure, an injection molding device is provided. The injection molding device includes: the plasticizing device; and a nozzle configured to inject a plasticized material supplied from the plasticizing device toward a metal mold.

DESCRIPTION OF EXEMPLARY EMBODIMENTS

A. First Embodiment

Figure 1:
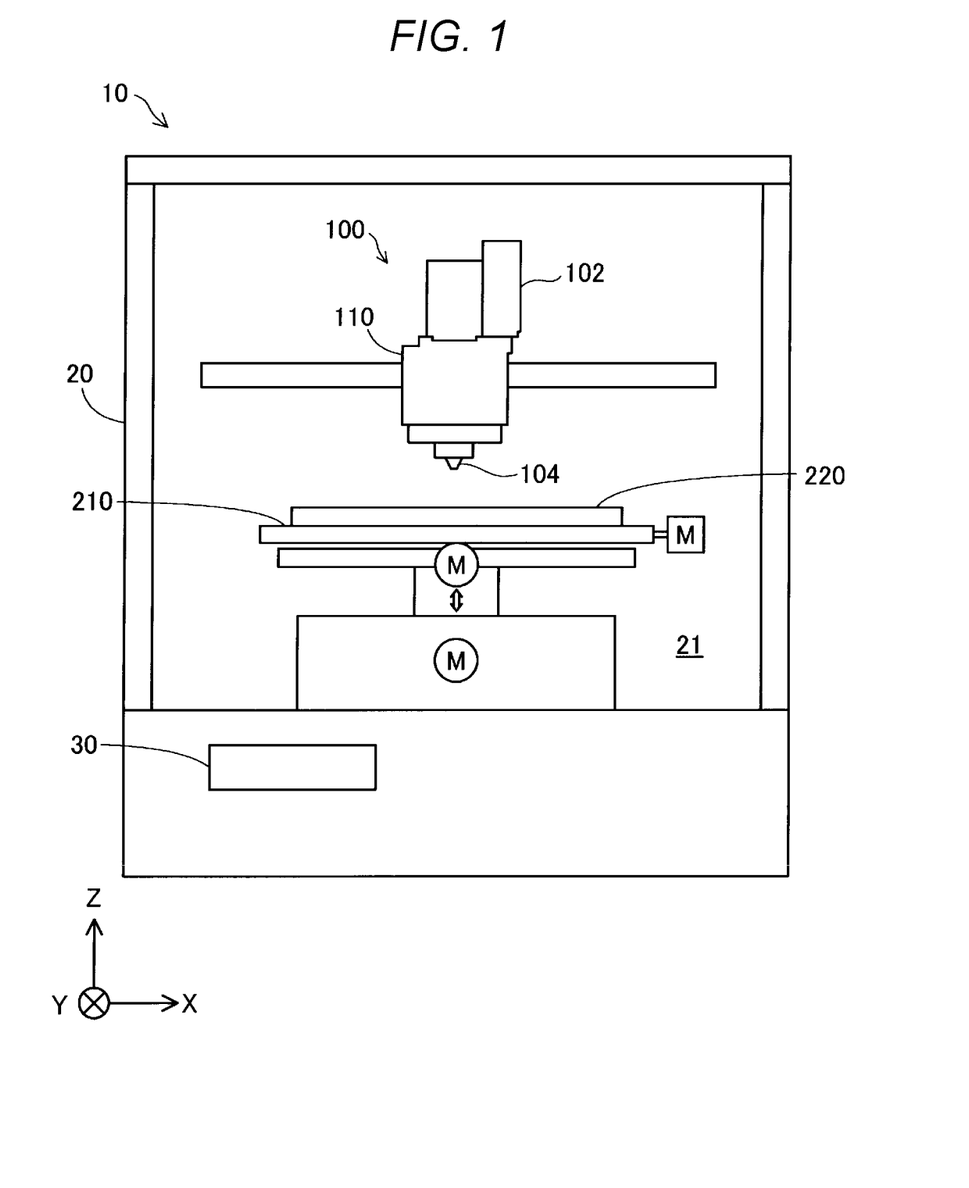
FIG. 1 is a diagram showing a schematic configuration of a three-dimensional shaping device according to a first embodiment.

FIG. 1 is a diagram showing a schematic configuration of a three-dimensional shaping device 10 according to a first embodiment. FIG. 1 shows arrows along X, Y, and Z directions orthogonal to one another. The X, Y, and Z directions in FIG. 1 and X, Y, and Z directions in other drawings represent the same directions. Hereinafter, a +Z direction is referred to as "upper", and a −Z direction is referred to as "lower".

The three-dimensional shaping device 10 includes a discharge unit 100, a movement mechanism 210, a stage 220, a chamber 20, and a control unit 30.

The discharge unit 100 includes a plasticizing device 110, a material accommodating part 102, and a nozzle 104. The material accommodating part 102 is, for example, a hopper. In the present embodiment, a pellet-shaped resin is accommodated in the material accommodating part 102 as a material. The material may be pressure-fed to the material accommodating part 102 from an outside via a tube. The plasticizing device 110 plasticizes at least a part of the material supplied from the material accommodating part 102. The material plasticized by the plasticizing device 110 is supplied to the nozzle 104, and is discharged from the nozzle 104 toward a shaping surface located at an upper surface of the stage 220. In the present embodiment, "plasticization" is a concept including melting, and refers to changing from a solid state to a flowable state. Specifically, for a material in which glass transition occurs, the plasticization refers to setting a temperature of the material to be equal to or higher than a glass transition point. For a material in which glass transition does not occur, the plasticization refers to setting a temperature of the material to be equal to or higher than a melting point.

The movement mechanism 210 changes a relative position between the discharge unit 100 and the stage 220. In the present embodiment, the movement mechanism 210 moves the stage 220 with respect to the discharge unit 100. The movement mechanism 210 in the present embodiment includes a three-axis positioner that moves the stage 220 in three axial directions of the X, Y, and Z directions by driving forces of three motors. Each motor is driven under control of the control unit 30. In another embodiment, the movement mechanism 210 may be implemented to move the discharge unit 100 without moving the stage 220, for example, instead of moving the stage 220. In addition, the movement mechanism 210 may be implemented to move both the stage 220 and the discharge unit 100.

The chamber 20 has a shaping space 21 inside. The discharge unit 100, the movement mechanism 210, and the stage 220 are accommodated in the shaping space 21. The chamber 20 may be provided with a heater for heating the shaping space 21.

The control unit 30 includes a computer including one or more processors, a memory, and an input and output interface through which signals are input and output from and to the outside. The control unit 30 controls the plasticizing device 110 and the stage 220 by the processor executing a program or a command read into the memory. The control unit 30 controls the plasticizing device 110 to discharge a shaping material while controlling movement of the stage 220, thereby stacking a plurality of layers of the shaping material on the stage 220 and shaping a three-dimensional shaped object. The control unit 30 may include a combination of a plurality of circuits instead of a computer.

Figure 2:
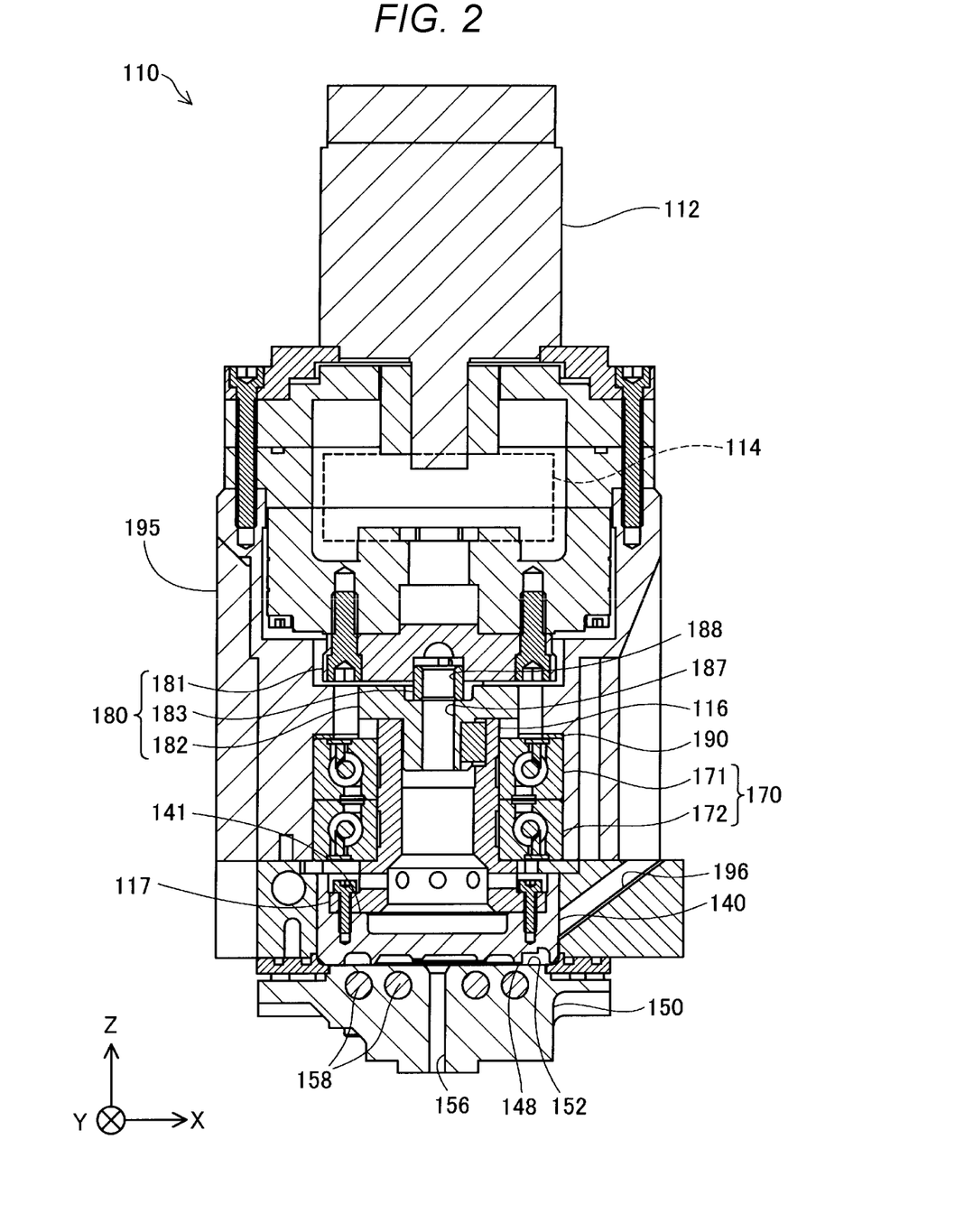
FIG. 2 is a cross-sectional view showing a schematic configuration of a plasticizing device.

FIG. 2 is a cross-sectional view showing a schematic configuration of the plasticizing device 110. The plasticizing device 110 includes a drive motor 112, a speed reducer 114, a screw shaft 116, a flat screw 140, a barrel 150, a heating unit 158, a bearing part 170, a coupling mechanism 180, and a spacer 190. These components are accommodated in or fixed to a housing 195.

The drive motor 112 is a motor for rotating the flat screw 140. The drive motor 112 is controlled by the control unit 30.

The speed reducer 114 is a device that reduces a rotational speed of an output shaft of the drive motor 112 in accordance with a predetermined speed reduction ratio and outputs a reduced rotational speed. As the speed reducer 114, for example, a planetary gear speed reducer or a wave gear speed reducer is used. In FIG. 2, a detailed configuration of the speed reducer 114 is omitted.

The screw shaft 116 is coupled to an upper surface of the flat screw 140. A surface, to which the screw shaft 116 is coupled, of the flat screw 140 is referred to as a coupling surface 141. The screw shaft 116 is rotated by the drive motor 112. More specifically, the screw shaft 116 is rotated by the drive motor 112 via the speed reducer 114 coupled to the drive motor 112. In the present embodiment, the screw shaft 116 has a cylindrical shape having a space inside. A flange portion 117 is provided at a lower end of the screw shaft 116. The screw shaft 116 and the flat screw 140 are joined together by bolts penetrating the flange portion 117. The flat screw 140 rotates about the screw shaft 116. The flat screw 140 has a groove forming surface 148, in which a groove is formed, at a surface at an opposite side from the coupling surface 141, that is, at a lower surface. A detailed configuration of the flat screw 140 will be described later.

The barrel 150 is disposed below the flat screw 140. The barrel 150 has a facing surface 152 facing the groove forming surface 148 of the flat screw 140. The groove forming surface 148 and the facing surface 152 are separated from each other at a predetermined interval. This interval is determined by experiments or simulations as an interval at which a material can be satisfactorily plasticized. A communication hole 156 communicating with the nozzle 104 is formed in the barrel 150. A detailed configuration of the barrel 150 will be described later.

The heating unit 158 is embedded in the barrel 150. The heating unit 158 includes, for example, a rod-shaped heater or an annular heater. The heating unit 158 heats the material supplied to between the flat screw 140 and the barrel 150. Heating by the heating unit 158 is controlled by the control unit 30.

The housing 195 is provided with a material supply path 196 for supplying the material to between the flat screw 140 and the barrel 150. The material supply path 196 is connected to the material accommodating part 102 shown in FIG. 1. The material is supplied to between the flat screw 140 and the barrel 150 from the material accommodating part 102 through the material supply path 196.

The bearing part 170 is provided at an outer periphery of the screw shaft 116. The bearing part 170 supports the screw shaft 116 such that the screw shaft 116 is rotatable with respect to the housing 195. The bearing part 170 can receive a thrust load applied to the screw shaft 116 from the flat screw 140. The flange portion 117 of the screw shaft 116 is in contact with a lower surface of an inner ring of the bearing part 170.

The bearing part 170 according to the present embodiment includes an angular bearing for receiving the thrust load from the flat screw 140. More specifically, the bearing part 170 has a configuration in which a plurality of angular ball bearings 171 and 172 are disposed back-to-back with each other. The angular ball bearings 171 and 172 each include a ball as a rolling element between an inner ring and an outer ring, and a straight line connecting contact points between the ball and the inner ring and between the ball and the outer ring has a contact angle. With such a structure, the angular ball bearings 171 and 172 can receive both a radial load and an axial load. The angular ball bearings 171 and 172 are disposed back-to-back with each other, so that a distance between action points of the bearing part 170 is increased, and load-carrying capacity for a moment load can be improved.

The annular spacer 190 is disposed in a gap between an upper surface of an outer ring of the bearing part 170 and the housing 195. The spacer 190 absorbs dimensional variations along a direction of a rotation axis of the bearing part 170. The spacer 190 may be omitted.

Figure 3:
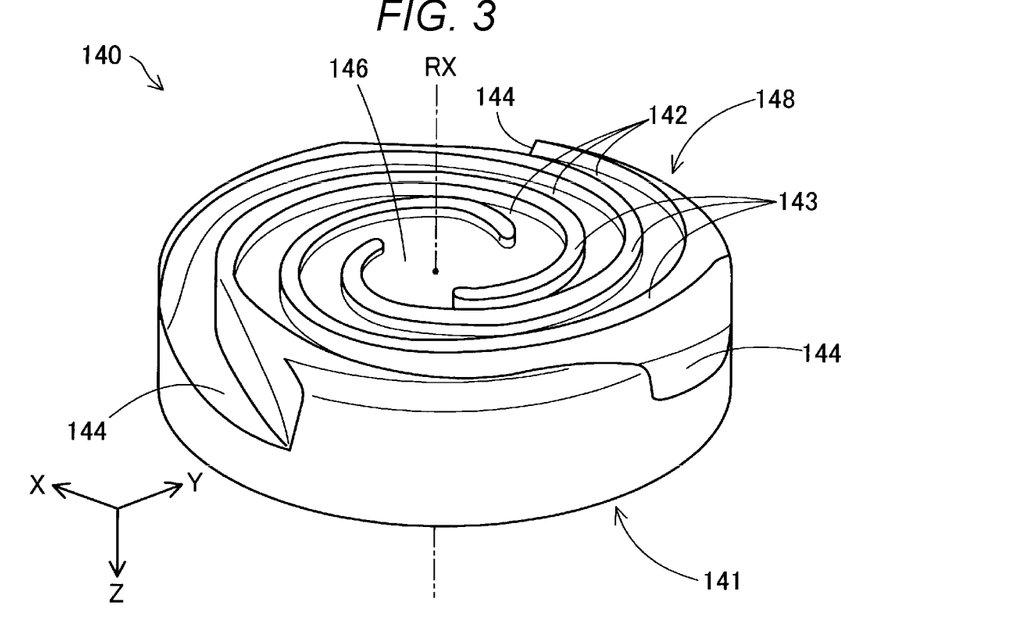
FIG. 3 is a perspective view showing a schematic configuration of a flat screw.

FIG. 3 is a perspective view showing a schematic configuration of the flat screw 140. FIG. 3 shows that the flat screw 140 is inverted upside down. In FIG. 3, a position of a central axis RX of the flat screw 140 is indicated by a dot-dash line. The flat screw 140 has a substantially cylindrical shape in which a height in a direction along the central axis RX is smaller than a diameter thereof. The flat screw 140 has the groove forming surface 148 facing the facing surface 152 of the barrel 150. The groove forming surface 148 is provided with groove portions 142. A central portion 146 of the groove forming surface 148 is configured as a recess to which one end of each groove portion 142 is connected. The central portion 146 faces the communication hole 156 of the barrel 150 shown in FIG. 2.

The groove portions 142 of the flat screw 140 form so-called scroll grooves. The groove portions 142 extend in arcs from the central portion 146 toward an outer periphery of the flat screw 140, presenting a whorl shape. The groove portions 142 may also extend in an involute curve shape or a spiral shape. The groove forming surface 148 is provided with ridge portions 143 that constitute side wall portions of the groove portions 142 and extend along each groove portion 142. The groove portions 142 are continuous to material introduction ports 144 formed at a side surface of the flat screw 140. The material introduction ports 144 are portions that receive the material supplied through the material supply path 196.

FIG. 3 shows an example of the flat screw 140 having three groove portions 142 and three ridge portions 143. The number of the groove portions 142 or the ridge portions 143 provided in the flat screw 140 is not limited to three, and only one groove portion 142 may be provided, or two or more groove portions 142 may be provided. FIG. 3 shows an example of the flat screw 140 in which the material introduction ports 144 are formed at three positions. The number of the material introduction ports 144 provided in the flat screw 140 is not limited to three, and only one material introduction port 144 may be provided, or two or more material introduction ports 144 may be provided. The flat screw is also simply referred to as a screw or a rotor.

Figure 4:
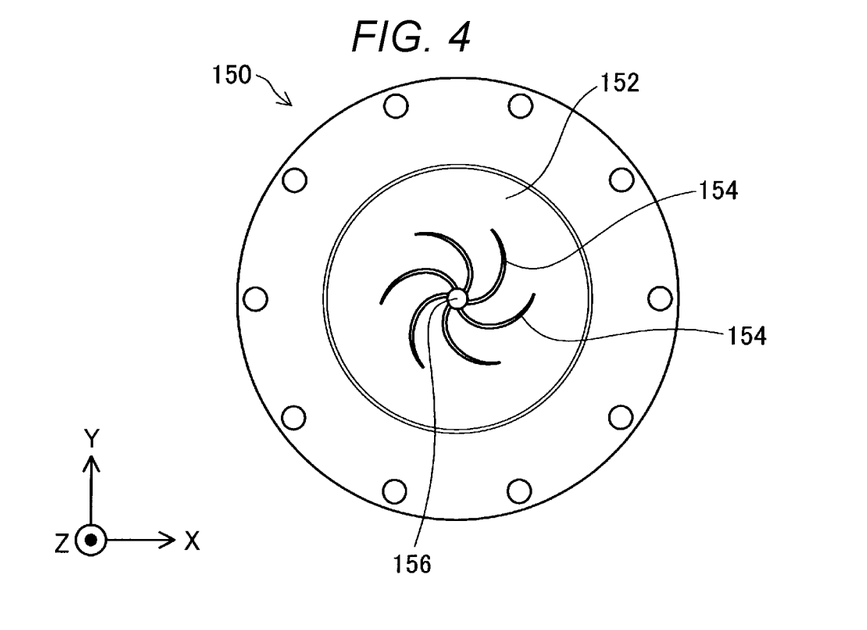
FIG. 4 is a top view of a barrel.

FIG. 4 is a top view of the barrel 150. The barrel 150 has the facing surface 152 facing the groove forming surface 148 of the flat screw 140. The communication hole 156 communicating with the nozzle 104 is formed at a center of the facing surface 152. A plurality of guide grooves 154 are formed around the communication hole 156 in the facing surface 152. Each of the guide grooves 154 has one end connected to the communication hole 156. The guide grooves 154 extend from the communication hole 156 toward an outer periphery of the facing surface 152, presenting a whorl shape. Each of the guide grooves 154 has a function of guiding the shaping material to the communication hole 156. The one end of the guide groove 154 may not be connected to the communication hole 156. The guide grooves 154 may not be formed in the barrel 150.

The material supplied into the groove portions 142 of the flat screw 140 flows along the groove portions 142 by rotation of the flat screw 140 while being melted in the groove portions 142, and is guided to the central portion 146 of the flat screw 140 as the shaping material. The paste-like shaping material exhibiting fluidity flowing into the central portion 146 flows into the nozzle 104 through the communication hole 156 provided at a center of the barrel 150, and is discharged from the nozzle 104 toward the stage 220. In the shaping material, all types of substances constituting the shaping material may not be melted. The shaping material may be converted into a state having fluidity as a whole by melting at least a part of types of the substances constituting the shaping material. The shaping material is also referred to as a plasticized material.

Figure 5:
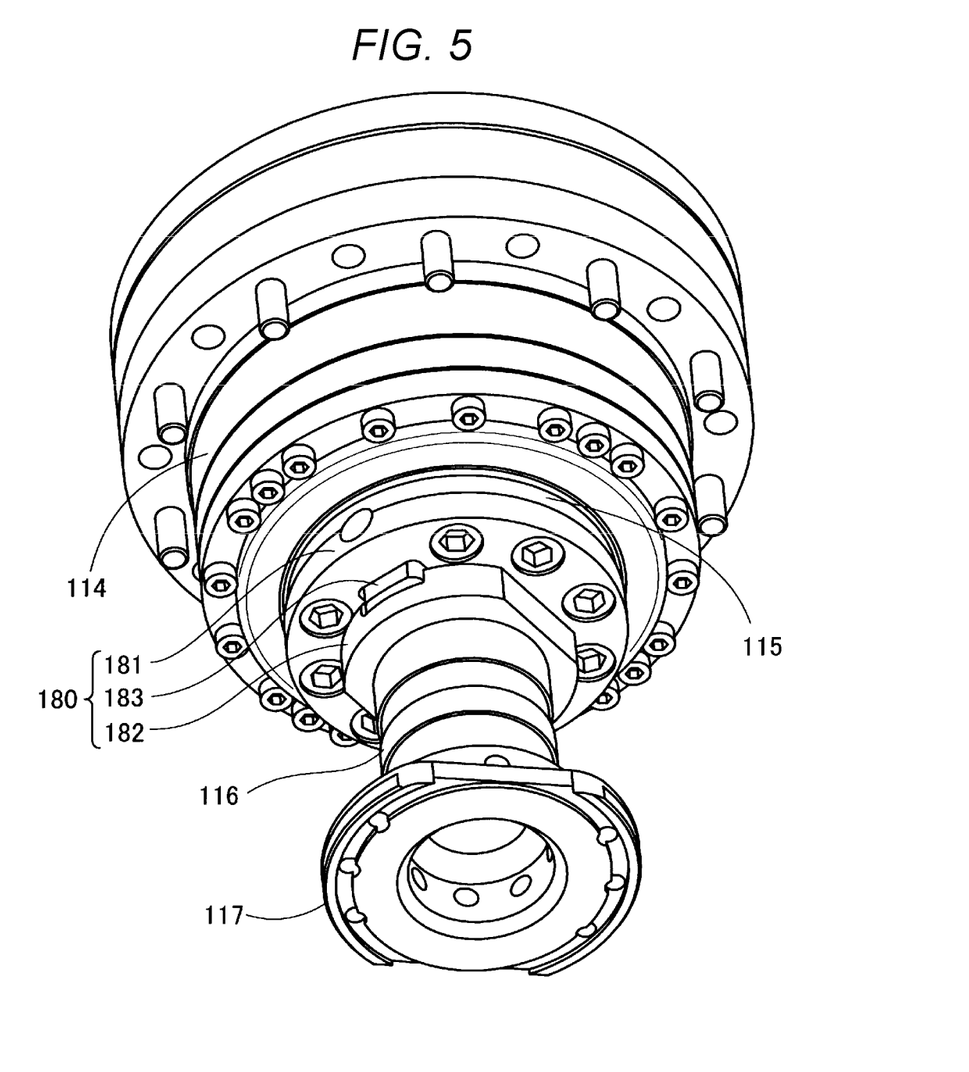
FIG. 5 is a perspective view showing a coupling mechanism.

FIG. 5 is a perspective view showing the coupling mechanism 180 disposed between the speed reducer 114 and the screw shaft 116. The coupling mechanism 180 couples an output shaft 115 of the speed reducer 114 to the screw shaft 116, and prevents the thrust load, which is applied from the flat screw 140 to the screw shaft 116, from being transmitted to the output shaft 115 of the speed reducer 114. In the present embodiment, the coupling mechanism 180 includes a first component 181, a second component 182, and a third component 183.

Figure 6:
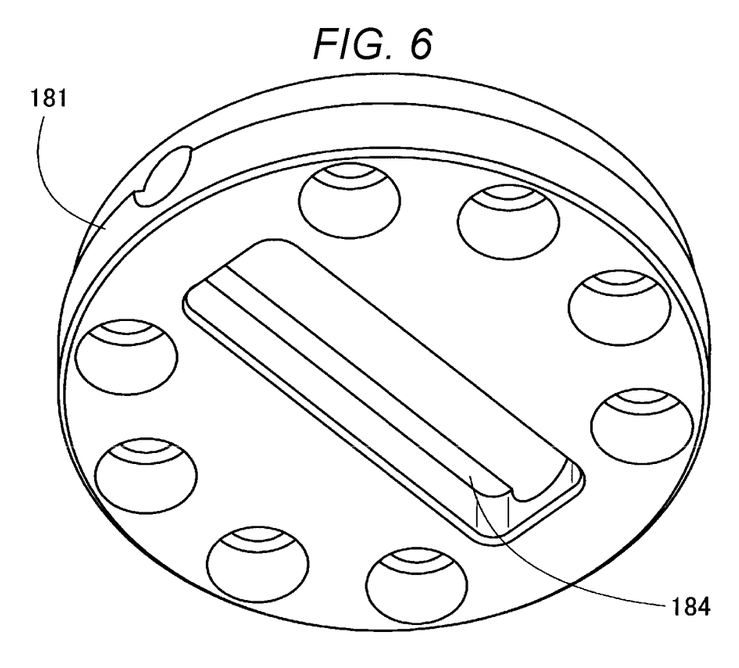
FIG. 6 is a perspective view showing a first component.

FIG. 6 is a perspective view of the first component 181. The first component 181 is a component fixed to the output shaft 115 of the speed reducer 114. In the present embodiment, the first component 181 has a circular shape, and a plurality of bolt holes, into which bolts used to fix the first component 181 to the output shaft 115 are inserted, are formed near an outer periphery of the first component 181. A first recessed portion 184 having a rectangular shape is formed in a lower surface of the first component 181, that is, in a central portion of a surface of the first component 181 facing the second component 182. The third component 183 is disposed in the first recessed portion 184.

Figure 7:
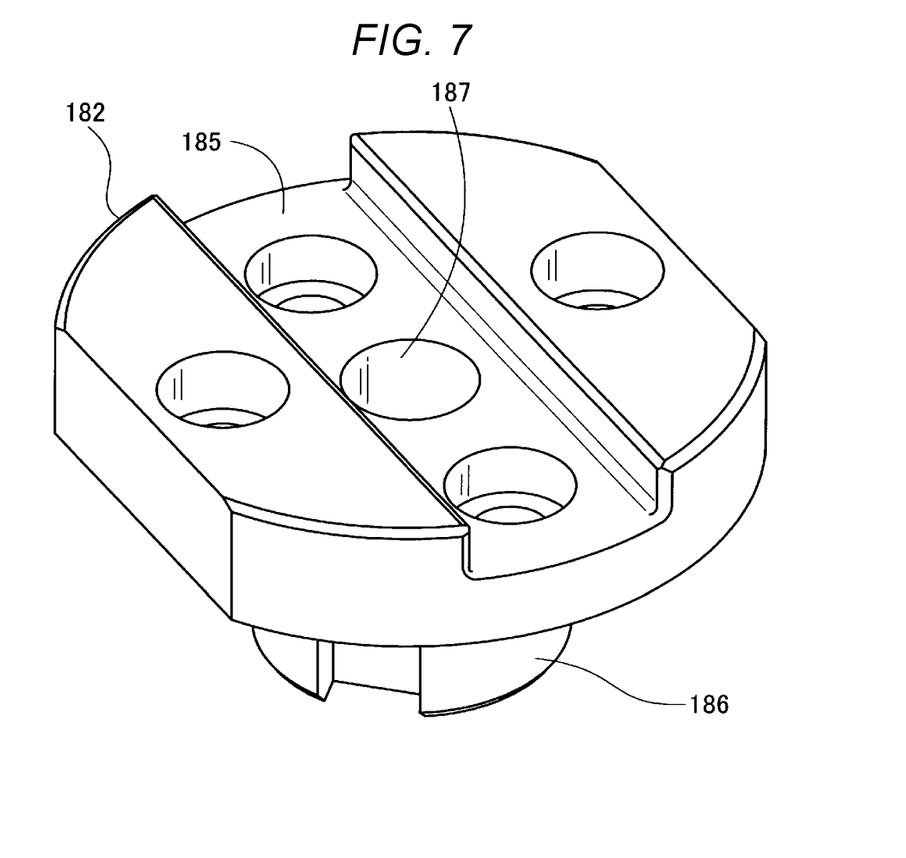
FIG. 7 is a perspective view showing a second component.

FIG. 7 is a perspective view of the second component 182. The second component 182 is a component fixed to the screw shaft 116. As shown in FIG. 2, the second component 182 is fixed to the screw shaft 116 such that a gap is formed between the second component 182 and the first component 181. As shown in FIG. 7, in the present embodiment, the second component 182 has a substantially circular shape, and a plurality of bolt holes, into which bolts used to fix the second component 182 to the screw shaft 116 are inserted, are formed near an outer periphery of the second component 182. A second recessed portion 185 in a slit shape is formed in an upper surface of the second component 182, that is, in a central portion of a surface of the second component 182 facing the first component 181. The third component 183 is disposed in the second recessed portion 185. The second component 182 includes a cylindrical protruding portion 186 at a lower surface thereof. The protruding portion 186 is inserted into an internal space of the screw shaft 116. A through hole 187 is formed in the second component 182 along a rotation axis of the screw shaft 116.

Figure 8:
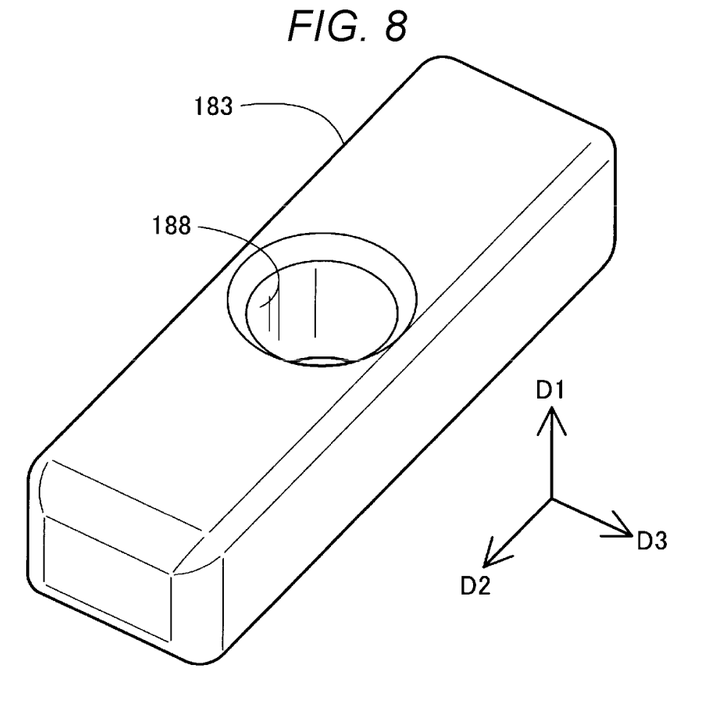
FIG. 8 is a perspective view showing a third component.

FIG. 8 is a perspective view of the third component 183. The third component 183 is a component interposed between the first component 181 and the second component 182. In the present embodiment, the third component 183 has a substantially rectangular parallelepiped shape, and includes a through hole 188 in a central portion along the rotation axis of the screw shaft 116. A length of the third component 183 in a longitudinal direction is shorter than lengths of the first recessed portion 184 and the second recessed portion 185 in the longitudinal direction. A width of the third component 183 in a lateral direction is shorter than a width of the first recessed portion 184 in the lateral direction and a width of the second recessed portion 185 in the lateral direction. A height of the third component 183 along the rotation axis of the screw shaft 116 is smaller than a sum of a depth of the first recessed portion 184 and a depth of the second recessed portion 185. Since the third component 183 is formed to have such dimensions, the third component 183 is fitted into the first recessed portion 184 of the first component 181 and the second recessed portion 185 of the second component 182 while being spaced apart therefrom at intervals respectively in a first direction D1 along the rotation axis of the screw shaft 116, a second direction D2 perpendicular to the first direction D1, and a third direction D3 perpendicular to both the first direction D1 and the second direction D2. That is, the third component 183 is fitted into the first recessed portion 184 of the first component 181 and the second recessed portion 185 of the second component 182 with plays in all directions. The first direction D1 can be referred to as a thickness direction of the third component 183, the second direction D2 can be referred to as the longitudinal direction of the third component 183, and the third direction D3 can be referred to as the lateral direction of the third component 183.

According to the three-dimensional shaping device 10 of the first embodiment described above, even when the thrust load is generated in the screw shaft 116 due to an increase in an internal pressure between the flat screw 140 and the barrel 150, the screw shaft 116 is supported by the bearing part 170 capable of receiving the thrust load, and thus displacement of the screw shaft 116 can be prevented. As a result, an appropriate gap can be secured between the flat screw 140 and the barrel 150, and the plasticizing capacity can be kept constant.

Further, in the present embodiment, since the bearing part 170 includes a pair of the angular ball bearings 171 and 172 that are disposed back-to-back with each other, not only the thrust load from the screw shaft 116 but also the radial load can be received. Therefore, high rigidity can be obtained.

In addition, in the present embodiment, the coupling mechanism 180 is provided that couples the output shaft 115 of the speed reducer 114 to the screw shaft 116 and prevents the thrust load applied to the screw shaft 116 from being transmitted to the output shaft 115 of the speed reducer 114. Therefore, even when a large thrust load is applied to the screw shaft 116 and the bearing part 170 is displaced, the speed reducer 114 can be protected from the thrust load.

In the present embodiment, the coupling mechanism 180 includes the first component 181 fixed to the output shaft 115 of the speed reducer 114, the second component 182 fixed to the screw shaft 116, and the third component 183 interposed between the first component 181 and the second component 182. Therefore, transmission of the thrust load from the screw shaft 116 to the speed reducer 114 can be prevented by a simple structure.

In the present embodiment, the third component 183 of the coupling mechanism 180 is fitted into the first recessed portion 184 of the first component 181 and the second recessed portion 185 of the second component 182 while being spaced apart therefrom at intervals respectively in the three directions D1, D2, and D3 orthogonal to one another. Therefore, not only the transmission of the thrust load to the speed reducer 114 can be prevented, but also the third component 183 can freely move in the first recessed portion 184 of the first component 181 and the second recessed portion 185 of the second component 182 even when deviation occurs in the output shaft 115 of the speed reducer 114 and the rotation axis of the screw shaft 116. Thus, deviation of the axis can be allowed and the screw shaft 116 can be caused to rotate.

In the present embodiment, the screw shaft 116 is formed in a cylindrical shape and has a space inside. Therefore, a weight of the screw shaft 116 can be reduced. In addition, since through holes are also formed in the second component 182 and the third component 183 of the coupling mechanism 180, these components can be reduced in weight. In another embodiment, the screw shaft 116 may have a solid structure having no space inside, and the second component 182 and the third component 183 may not have through holes.

B. Second Embodiment

Figure 9:
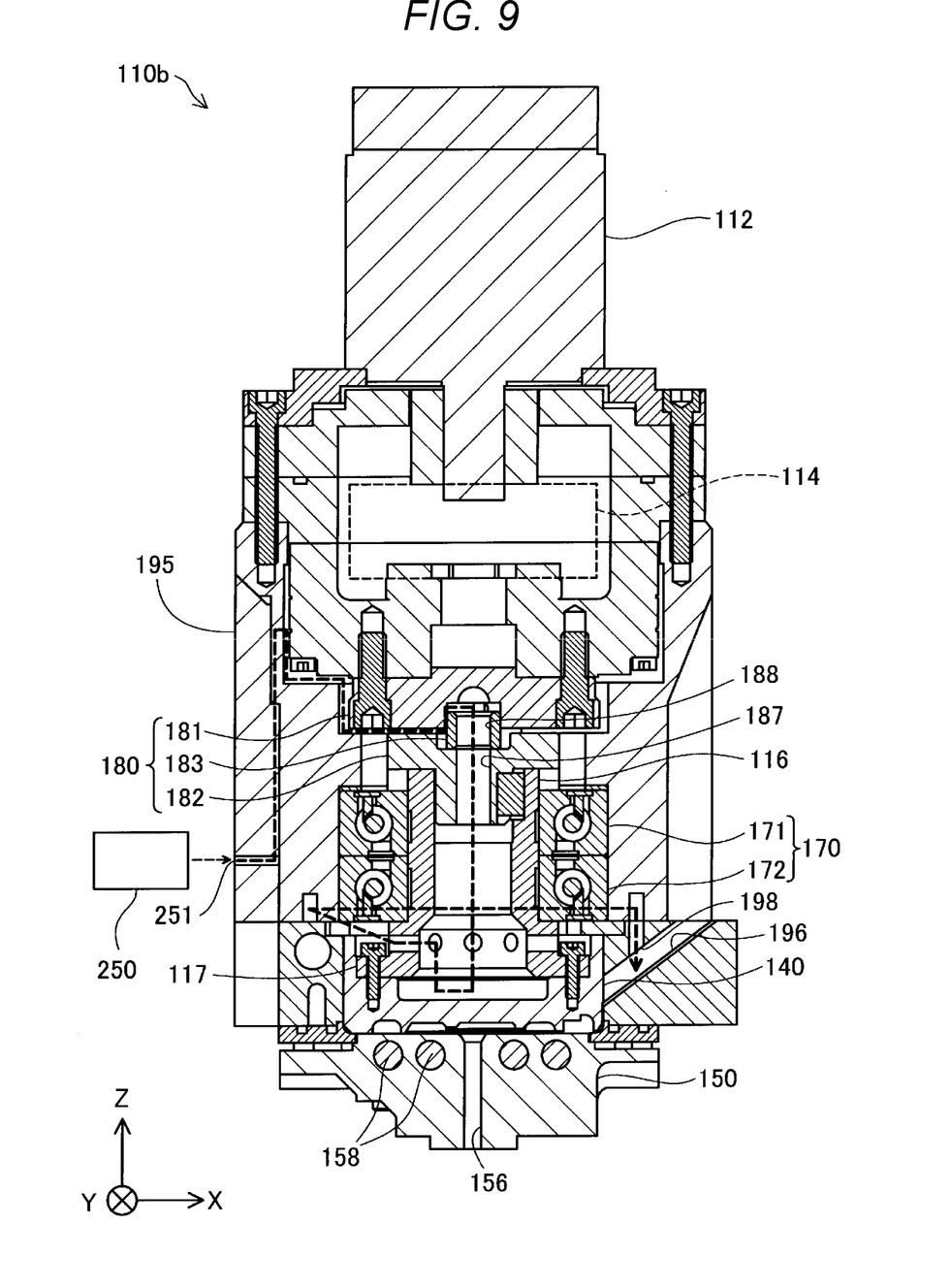
FIG. 9 is a cross-sectional view showing a schematic configuration of a plasticizing device according to a second embodiment.

FIG. 9 is a cross-sectional view showing a schematic configuration of a plasticizing device 110b according to a second embodiment. The plasticizing device 110b according to the present embodiment is different from the plasticizing device 110 according to the first embodiment in that the plasticizing device 110b includes a cooling unit 250 that cools the flat screw 140. The cooling unit 250 causes a cooling medium to flow into the space in the screw shaft 116. In the present embodiment, air is used as the cooling medium. The cooling unit 250 includes a blower fan or an air pump. Other gases such as nitrogen may be used as the cooling medium.

The housing 195 of the plasticizing device 110b is provided with an inflow port 251 through which the cooling medium flows in from the cooling unit 250. In FIG. 9, a flow of the cooling medium in the plasticizing device 110b is schematically indicated by a broken line. When the cooling medium flowing in from the inflow port 251 flows into the housing 195, the cooling medium flows out to a side surface of the speed reducer 114 through a flow path (not shown) provided in the housing 195. The cooling medium flows downward at the side surface of the speed reducer 114, passes between the first component 181 and the second component 182 of the coupling mechanism 180, passes through the through hole 188 of the third component 183 and the through hole 187 of the second component 182, and reaches the internal space of the screw shaft 116. The internal space of the screw shaft 116 is in contact with the upper surface of the flat screw 140. The cooling medium reaching the internal space of the screw shaft 116 cools the flat screw 140, then passes through the flow path provided in the housing 195 from a through hole formed in a side surface of the screw shaft 116, and is discharged from an opening 198 provided in the material supply path 196. The opening 198 communicates with the internal space in the screw shaft 116.

According to the second embodiment described above, since the cooling unit 250 that causes the cooling medium to flow into the space in the screw shaft 116 is provided, the flat screw 140 coupled to the screw shaft 116 can be cooled. Therefore, it is possible to prevent an excessive increase in a temperature of the flat screw 140. In addition, in the present embodiment, the cooling medium flows in the housing 195 as described above, so that not only the flat screw 140 but also the speed reducer 114 and the coupling mechanism 180 can be cooled. Further, in the present embodiment, since the cooling medium that passes through an inside of the plasticizing device 110b is discharged from the opening 198 provided in the material supply path 196, it is possible to stir the material near the opening 198 and prevent clogging of the material in the material supply path 196.

Although the opening 198 as an outlet of the cooling medium is provided in the material supply path 196 in the second embodiment, the opening 198 may be provided at any position of the housing 195, for example, a position near the inflow port 251. In this case, a liquid such as water or oil may be used as the cooling medium instead of a gas such as air.

C. Third Embodiment

Figure 10:
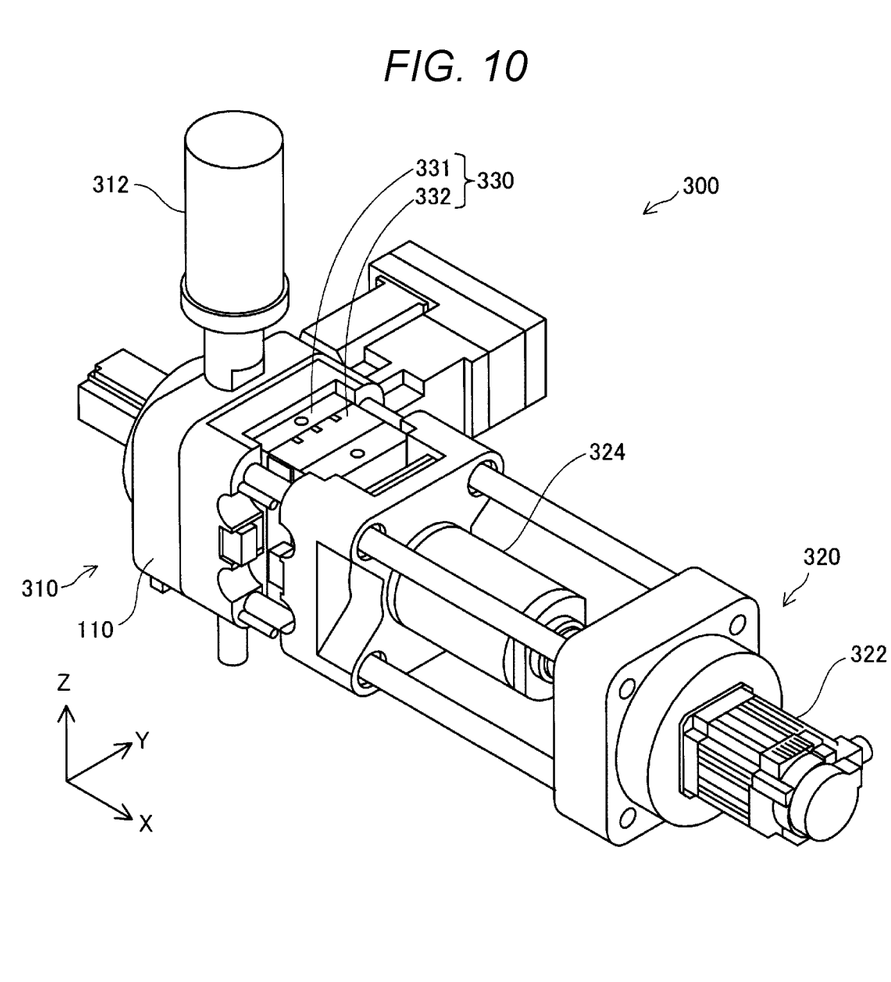
FIG. 10 is a perspective view showing a schematic configuration of an injection molding device according to a third embodiment.

FIG. 10 is a perspective view showing a schematic configuration of an injection molding device 300 according to a third embodiment. The injection molding device 300 includes an injection unit 310, a mold clamping device 320, and a molding mold 330. The injection molding device 300 injects a plasticized molding material into the molding mold 330 including a fixed mold 331 and a movable mold 332 from a nozzle provided in the injection unit 310 so as to mold a molded product. As the molding mold 330, a metal mold or a resin mold can be used, and in the present embodiment, a metal mold is used.

The mold clamping device 320 has a function of opening and closing the fixed mold 331 and the movable mold 332. The mold clamping device 320 rotates a ball screw 324 by driving a mold drive unit 322 including a motor under the control of the control unit, and causes the movable mold 332 joined to the ball screw 324 to move with respect to the fixed mold 331 to open and close the molding mold 330.

A hopper 312 into which a material of the molded product is fed is connected to the injection unit 310. The injection unit 310 plasticizes at least a part of the material supplied from the hopper 312 to generate a molding material, and injects the molding material into a cavity partitioned between the fixed mold 331 and the movable mold 332. The injection unit 310 includes the plasticizing device 110 shown in FIG. 2, and plasticizes the material by the plasticizing device 110 and injects the plasticized material into the molding mold 330. The injection unit 310 may include the plasticizing device 110b shown in FIG. 9.

The injection molding device 300 according to the third embodiment described above includes the plasticizing device 110 or 110b described in the first embodiment or the second embodiment, and thus the plasticized material can be stably injected into the molding mold 330.

D. Other Embodiments (D1) In the above embodiments, the bearing part 170 includes two angular bearings. Alternatively, the bearing part 170 may include one angular bearing. Further, in the above embodiments, two angular bearings are disposed back-to-back with each other, and may be disposed face-to-face with each other. By disposing the angular bearings face-to-face with each other, an allowable inclination amount can be increased. In addition, the bearing part 170 may include a thrust bearing capable of receiving a thrust load. In this case, for example, the thrust bearing can be disposed so as to be in contact with the flange portion 117 of the flat screw 140, and one or a plurality of radial bearings can be disposed above the thrust bearing. In this manner, in the above embodiments, various combinations of bearings are possible, and an angular bearing, a thrust bearing, and a radial bearing may be appropriately combined to be capable of receiving the thrust load applied to the screw shaft 116. In addition, the number of bearings provided in the bearing part 170 is not limited to one or two, and three or more bearings may be provided therein. Each of the bearings constituting the bearing part 170 may be a ball bearing or a roller bearing.

(D2) In the above embodiments, a set of angular bearings constituting the bearing part 170 include two single-row angular ball bearings disposed back-to-back with each other. Alternatively, a set of angular bearings may include a double-row angular bearing in which inner rings and outer rings of two bearings are integrated correspondingly.

(D3) In the above embodiments, the speed reducer 114 and the screw shaft 116 are coupled to each other via the coupling mechanism 180. Alternatively, the speed reducer 114 and the screw shaft 116 may be directly coupled to each other. In addition, a configuration in which the drive motor 112 and the screw shaft 116 are directly coupled to each other is also possible.

(D4) In the above embodiments, the third component 183 provided in the coupling mechanism 180 may not have plays in the second direction D2 and the third direction D3 among the three directions D1, D2, and D3. That is, the third component 183 may have a play at least in the first direction D1 along the rotation axis of the screw shaft 116.

(D5) The coupling mechanism 180 in the above embodiments may adopt various configurations as long as the configuration can prevent the transmission of the thrust load to the output shaft 115 of the speed reducer 114. For example, various coupling mechanisms such as an Oldham type, a disc type, and a slit type can be adopted.

E. Other Embodiments

The present disclosure is not limited to the above embodiments, and can be implemented with various configurations within a scope not departing from the gist of the present disclosure. For example, technical features of the embodiments corresponding to technical features of the embodiments described below can be appropriately replaced or combined in order to solve a part or all of the above problems or to achieve a part or all of the above effects. Any of the technical features may be omitted as appropriate unless the technical feature is described as essential herein.

(1) According to a first embodiment of the present disclosure, a plasticizing device is provided. The plasticizing device includes: a drive motor; a screw shaft rotated by the drive motor; a flat screw having a coupling surface coupled to the screw shaft and a groove forming surface in which a groove is formed, and configured to rotate around the screw shaft; a barrel having a facing surface facing the groove forming surface, and formed with a communication hole; a heating unit configured to heat a material supplied to between the flat screw and the barrel; and a bearing part configured to rotatably support the screw shaft and receive a thrust load applied to the screw shaft from the flat screw. The groove forming surface and the facing surface are separated from each other at a predetermined interval.

According to this embodiment, even when a thrust load is generated due to an increase in an internal pressure between the flat screw and the barrel, the screw shaft is supported by the bearing part capable of receiving the thrust load, and thus displacement of the screw shaft can be prevented. As a result, an appropriate gap can be secured between the flat screw and the barrel, and plasticizing capacity can be kept constant.

(2) In the above embodiment, the bearing part may include an angular bearing. According to this embodiment, the angular bearing can receive the thrust load.

(3) In the above embodiment, the bearing part may have a configuration in which a plurality of the angular bearings are disposed back-to-back with each other. According to this embodiment, not only the thrust load from the screw shaft but also a radial load can be received.

(4) In the above embodiment, the screw shaft rotates via a speed reducer coupled to the drive motor, and a coupling mechanism is provided that couples an output shaft of the speed reducer to the screw shaft and that prevents the thrust load applied to the screw shaft from being transmitted to the output shaft of the speed reducer. According to this embodiment, since the transmission of the thrust load from the screw shaft to the speed reducer can be prevented, the speed reducer can be protected from the thrust load.

(5) In the above embodiment, the coupling mechanism may include a first component fixed to the output shaft of the speed reducer, a second component fixed to the screw shaft, and a third component that is interposed between the first component and the second component and that is fitted into the first component and the second component while being spaced apart therefrom at an interval at least in a first direction along the screw shaft. According to this embodiment, the transmission of the thrust load from the screw shaft to the speed reducer can be prevented by a simple configuration.

(6) In the above embodiment, the third component may be fitted to the first component and the second component while being spaced apart therefrom at intervals respectively in a second direction as a direction perpendicular to the screw shaft, and a third direction as a direction perpendicular to both the first direction and the second direction, in addition to the first direction. According to this embodiment, it is possible to cause the screw shaft to rotate while allowing deviation of the axis in the output shaft of the speed reducer and the rotation axis of the screw shaft.

(7) In the above embodiment, the screw shaft may have a space inside. According to this embodiment, a weight of the screw shaft can be reduced.

(8) In the above embodiment, the plasticizing device may include a cooling unit that causes a cooling medium to flow into the space. According to this embodiment, it is possible to prevent an excessive increase in a temperature of the flat screw by cooling the space in the screw shaft.

(9) In the above embodiment, a material supply path configured to supply the material to between the flat screw and the barrel may be provided, and the material supply path may include an opening that communicates with the space. According to this embodiment, since the cooling medium can be discharged from the space in the screw shaft through the opening provided in the material supply path, clogging of the material in the material supply path can be prevented.

(10) According to a second embodiment of the present disclosure, a three-dimensional shaping device is provided, which includes the plasticizing device, a stage having a shaping surface, and a nozzle that discharges a plasticized material supplied from the plasticizing device toward the shaping surface.

(11) According to a third embodiment of the present disclosure, an injection molding device is provided, which includes the plasticizing device, and a nozzle that injects a plasticized material supplied from the plasticizing device toward a metal mold.

What is claimed is:

1. A plasticizing device comprising:
   a drive motor;
   a screw shaft rotated by the drive motor, wherein the screw shaft rotates via a speed reducer coupled to the drive motor;
   a flat screw having a coupling surface coupled to the screw shaft and a groove forming surface in which a groove is formed, and configured to rotate around the screw shaft;
   a barrel having a facing surface facing the groove forming surface, and formed with a communication hole;
   a heating unit configured to heat a material supplied to between the flat screw and the barrel;
   a bearing part configured to rotatably support the screw shaft and receive a thrust load applied to the screw shaft from the flat screw while being spaced apart from the coupling surface, wherein the groove forming surface and the facing surface are separated from each other at a predetermined interval; and
   a coupling mechanism configured to couple an output shaft of the speed reducer to the screw shaft and prevent the thrust load applied to the screw shaft from being transmitted to the output shaft of the speed reducer, the coupling mechanism including:
   a first component fixed to the output shaft of the speed reducer;
   a second component fixed to the screw shaft; and
   a third component that is interposed between the first component and the second component, and that is fitted into the first component and the second component while being spaced apart therefrom at an interval at least in a first direction along the screw shaft.

2. The plasticizing device according to claim 1, wherein the bearing part includes an angular bearing.

3. The plasticizing device according to claim 2, wherein the bearing part has a configuration in which a plurality of the angular bearings are disposed back-to-back with each other.

4. The plasticizing device according to claim 1, wherein the third component is fitted to the first component and the second component while being spaced apart therefrom at intervals respectively in a second direction as a direction perpendicular to the screw shaft, and a third direction as a direction perpendicular to both the first direction and the second direction, in addition to the first direction.

5. The plasticizing device according to claim 1, wherein the screw shaft has a space inside.

6. The plasticizing device according to claim 5, further comprising:
   a cooling unit configured to cause a cooling medium to flow into the space.

7. The plasticizing device according to claim 6, further comprising:
   a material supply path configured to supply the material to between the flat screw and the barrel, wherein the material supply path includes an opening that communicates with the space.

8. A three-dimensional shaping device comprising:
   a drive motor;
   a screw shaft rotated by the drive motor, wherein the screw shaft rotates via a speed reducer coupled to the drive motor;
   a flat screw having a coupling surface coupled to the screw shaft and a groove forming surface in which a groove is formed, and configured to rotate around the screw shaft;
   a barrel having a facing surface facing the groove forming surface, and formed with a communication hole;
   a heating unit configured to heat a material supplied to between the flat screw and the barrel;
   a bearing part configured to rotatably support the screw shaft and receive a thrust load applied to the screw shaft from the flat screw while being spaced apart from the coupling surface, wherein the groove forming surface and the facing surface are separated from each other at a predetermined interval; and
   a coupling mechanism configured to couple an output shaft of the speed reducer to the screw shaft and prevent the thrust load applied to the screw shaft from being transmitted to the output shaft of the speed reducer, the coupling mechanism including:
   a first component fixed to the output shaft of the speed reducer;
   a second component fixed to the screw shaft; and
   a third component that is interposed between the first component and the second component, and that is fitted into the first component and the second component while being spaced apart therefrom at an interval at least in a first direction along the screw shaft;
   a stage having a shaping surface; and
   a nozzle configured to discharge a plasticized material supplied from the plasticizing device toward the shaping surface.

9. An injection molding device comprising:
   a drive motor;
   a screw shaft rotated by the drive motor, wherein the screw shaft rotates via a speed reducer coupled to the drive motor;
   a flat screw having a coupling surface coupled to the screw shaft and a groove forming surface in which a groove is formed, and configured to rotate around the screw shaft;
   a barrel having a facing surface facing the groove forming surface, and formed with a communication hole;
   a heating unit configured to heat a material supplied to between the flat screw and the barrel;
   a bearing part configured to rotatably support the screw shaft and receive a thrust load applied to the screw shaft from the flat screw while being spaced apart from the coupling surface, wherein the groove forming surface and the facing surface are separated from each other at a predetermined interval; and
   a coupling mechanism configured to couple an output shaft of the speed reducer to the screw shaft and prevent the thrust load applied to the screw shaft from being transmitted to the output shaft of the speed reducer, the coupling mechanism including:
a first component fixed to the output shaft of the speed reducer;
a second component fixed to the screw shaft; and
a third component that is interposed between the first component and the second component, and that is fitted into the first component and the second component while being spaced apart therefrom at an interval at least in a first direction along the screw shaft;
a nozzle configured to inject a plasticized material supplied from the plasticizing device toward a metal mold.

10. The plasticizing device according to claim 1, wherein the bearing part being configured to rotatably support the screw shaft and receive the thrust load applied to the screw shaft from the flat screw while being spaced apart from the flat screw.

11. The plasticizing device of claim 1, wherein the screw shaft has a cylindrical shape.

12. The plasticizing device of claim 11, wherein the screw shaft has a space inside.

13. The plasticizing device of claim 1, wherein the coupling surface of the flat screw is joined to the screw shaft via a penetrating fastener extending through a flange of the screw shaft.

* * * * *